US011012866B2

(12) United States Patent
Ghosh et al.

(10) Patent No.: US 11,012,866 B2
(45) Date of Patent: *May 18, 2021

(54) DYNAMIC SPECTRUM PARTITIONING BETWEEN A FIRST RADIO ACCESS TECHNOLOGY AND A SECOND RADIO ACCESS TECHNOLOGY

(71) Applicant: AT&T Intellectual Property I, L.P., Atlanta, GA (US)

(72) Inventors: Arunabha Ghosh, Austin, TX (US); David R. Wolter, Austin, TX (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/661,079

(22) Filed: Oct. 23, 2019

(65) Prior Publication Data

US 2020/0059796 A1 Feb. 20, 2020

Related U.S. Application Data

(63) Continuation of application No. 15/062,162, filed on Mar. 6, 2016, now Pat. No. 10,462,675.

(51) Int. Cl.
*H04W 16/14* (2009.01)
*H04W 16/10* (2009.01)
*H04W 72/04* (2009.01)
*H04L 5/00* (2006.01)

(52) U.S. Cl.
CPC ............ *H04W 16/14* (2013.01); *H04L 5/001* (2013.01); *H04L 5/0048* (2013.01); *H04L 5/0062* (2013.01); *H04L 5/0098* (2013.01); *H04W 16/10* (2013.01); *H04W 72/0413* (2013.01)

(58) Field of Classification Search
CPC . H04W 16/14; H04W 16/10; H04W 72/0413; H04L 5/0098; H04L 5/001; H04L 5/0062; H04L 5/0048
See application file for complete search history.

(56) References Cited

U.S. PATENT DOCUMENTS

| | | |
|---|---|---|
| 8,649,254 B2 | 2/2014 | Ghosh |
| 8,861,575 B2 | 10/2014 | Ghosh |
| 8,983,393 B2 | 3/2015 | Raghavan et al. |
| 9,014,233 B2 | 4/2015 | Ghosh |
| 9,319,901 B2 | 4/2016 | Shen |
| 9,801,115 B2 | 10/2017 | Sadek |
| 10,015,693 B2 | 7/2018 | Zhang |
| 2009/0016420 A1 | 1/2009 | Kwak |
| 2009/0201867 A1 | 8/2009 | Teo |
| 2010/0216478 A1 | 8/2010 | Buddhikot |
| 2010/0322222 A1 | 12/2010 | Luo |
| 2012/0120821 A1 | 5/2012 | Kazmi |
| 2013/0143580 A1 | 6/2013 | Michel |
| 2013/0150054 A1 | 6/2013 | Axmon et al. |
| 2013/0225179 A1 | 8/2013 | Jul |

(Continued)

*Primary Examiner* — Tejis Daya
(74) *Attorney, Agent, or Firm* — Guntin & Gust, PLC; Jay Anderson (57) ABSTRACT

An eNodeB uses a first portion of a frequency spectrum as a primary cell and uses a second portion of the frequency spectrum as a secondary cell that is dynamically shared with a 5G base station. The eNodeB and the 5G base station communicate to dynamically share the second portion of the frequency spectrum.

20 Claims, 8 Drawing Sheets

(56) References Cited

U.S. PATENT DOCUMENTS

| | | |
|---|---|---|
| 2014/0171073 A1 | 6/2014 | Kim et al. |
| 2014/0349701 A1 | 11/2014 | Vajapeyam |
| 2015/0055631 A1 | 2/2015 | Ghosh |
| 2015/0063148 A1 | 3/2015 | Sadek |
| 2015/0063150 A1 | 3/2015 | Sadek |
| 2015/0065152 A1* | 3/2015 | Sadek ............... H04L 5/0089 455/450 |
| 2015/0098425 A1 | 4/2015 | Bergljung |
| 2015/0173004 A1 | 6/2015 | Nigam et al. |
| 2015/0188650 A1 | 7/2015 | Au et al. |
| 2015/0189574 A1 | 7/2015 | Ng |
| 2015/0215825 A1 | 7/2015 | Kim et al. |
| 2015/0223243 A1 | 8/2015 | Tabet |
| 2015/0245219 A1* | 8/2015 | Wei ................... H04L 5/001 370/336 |
| 2015/0264596 A1 | 9/2015 | Franklin et al. |
| 2015/0288809 A1* | 10/2015 | Liang ................. H04W 16/14 455/419 |
| 2015/0334642 A1 | 11/2015 | Maaref et al. |
| 2016/0021695 A1 | 1/2016 | Axmon et al. |
| 2016/0029235 A1 | 1/2016 | Kim et al. |
| 2016/0050690 A1 | 2/2016 | Yun |
| 2016/0057504 A1 | 2/2016 | Shelby |
| 2016/0066195 A1 | 3/2016 | Moon et al. |
| 2016/0309463 A1 | 10/2016 | Khawer |
| 2016/0323888 A1 | 11/2016 | Ryu |
| 2017/0086076 A1 | 3/2017 | Sadek |
| 2017/0094677 A1 | 3/2017 | Liu |
| 2017/0111931 A1 | 4/2017 | Damnjanovic |
| 2017/0170942 A1* | 6/2017 | Qiu .................... H04L 5/001 |
| 2017/0208494 A1 | 7/2017 | Moon et al. |
| 2017/0245288 A1 | 8/2017 | Lindoff |
| 2017/0251380 A1 | 8/2017 | Schabel |
| 2020/0252820 A1* | 8/2020 | Ozturk ............... H04W 16/14 |
| 2020/0252846 A1* | 8/2020 | Ozturk ............... H04W 36/38 |

\* cited by examiner

DYNAMIC SPECTRUM PARTITIONING BETWEEN A FIRST RADIO ACCESS TECHNOLOGY AND A SECOND RADIO ACCESS TECHNOLOGY

CROSS-REFERENCE TO RELATED APPLICATIONS

This application is a continuation of U.S. patent application Ser. No. 15/062,162, filed Mar. 6, 2016, entitled "Dynamic Spectrum Partitioning Between LTE and 5G Systems," naming Arunabha Ghosh and David Wolter as inventors, which application is incorporated herein by reference in its entirety.

BACKGROUND

Field of the Disclosure

This disclosure relates to deployment of next generation (5G) cellular technology.

Description of the Related Art

The next generation telecommunications network, referred to herein as 5G, is expected to comprise of two distinct radio access technologies (RATs). A first RAT is sub 6 GHz and a second RAT utilizes mm waves with frequencies ranging from 30-300 GHz. Of these two RAT components, the sub 6 GHz is expected to be deployed first.

The current generation of radio access technology is defined by various Third Generation Partnership Project (3GPP) Long Term Evolution (LTE) Specifications. For example, the physical layer (L1) of LTE is defined in various specifications including 3GPP TS 36.211 v9.1.0 (2010 March) 3rd Generation Partnership Project; Technical Specification Group Radio Access Network; Evolved Universal Terrestrial Radio Access (E-UTRA); Physical Channels and Modulation (Release 9) (and later releases) and 3GPP TS 36.212 V9.4.0 (2011 September) 3rd Generation Partnership Project; Technical Specification Group Radio Access Network; Evolved Universal Terrestrial Radio Access (E-UTRA); Multiplexing and channel coding (Release 9) (and later releases), and other 3GPP specifications.

During deployment of 5G, LTE (also referred to as 4G) technology will still be in use. Thus, both 5G and LTE RATs will be operating concurrently. Effective deployment of 5G while maintaining LTE operations is desirable.

SUMMARY OF EMBODIMENTS

Embodiments described herein allow LTE and 5G channels to reside in the same part of the spectrum and dynamically share spectrum.

Accordingly, in one embodiment a method is provided for a first radio access technology to share spectrum with a second radio access technology. The method includes a first base station utilizing a first portion of the spectrum as a primary carrier during a first time period to communicate with first user equipment in a first area, the first base station using the first radio access technology. The first base station utilizes a second portion of the spectrum as a secondary carrier during the first time period, the secondary carrier being aggregated with the first carrier to communicate in the first area. A second base station utilizes at least some of the second portion of the spectrum during a second time period to communicate with second user equipment in the first area, the second base station using the second radio access technology. The first base station utilizes the first portion of the spectrum as the primary carrier during the second time period but does not use the second portion.

In another embodiment, a first base station utilizes a first radio access technology to communicate in a first area and uses a first portion of a frequency spectrum as a primary carrier and a second portion of the frequency spectrum as a secondary carrier aggregated with the primary carrier during a first time period. A second base station utilizes second radio access technology to communicate in the first area, the second base station utilizing the second portion of the frequency spectrum during a second time period. The first base station is communicatively coupled to the second base station to synchronize dynamic sharing of the second portion of the frequency spectrum during the first and second time periods.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

It is currently believed that substantial spectrum will not be allocated in the United States for deployment of the sub 6 GHz component of 5G. Therefore it is very likely that in the early 5G deployment, both 5G and LTE will be deployed in the same band.

From past experience, clearing spectrum for deploying a new generation of technology requires the network be made more dense. The need to clear spectrum is unnecessary if new spectrum is available for the new RAT generation, but as stated previously this is unlikely to be the case for the sub 6 GHz 5G deployment.

Figure 1:
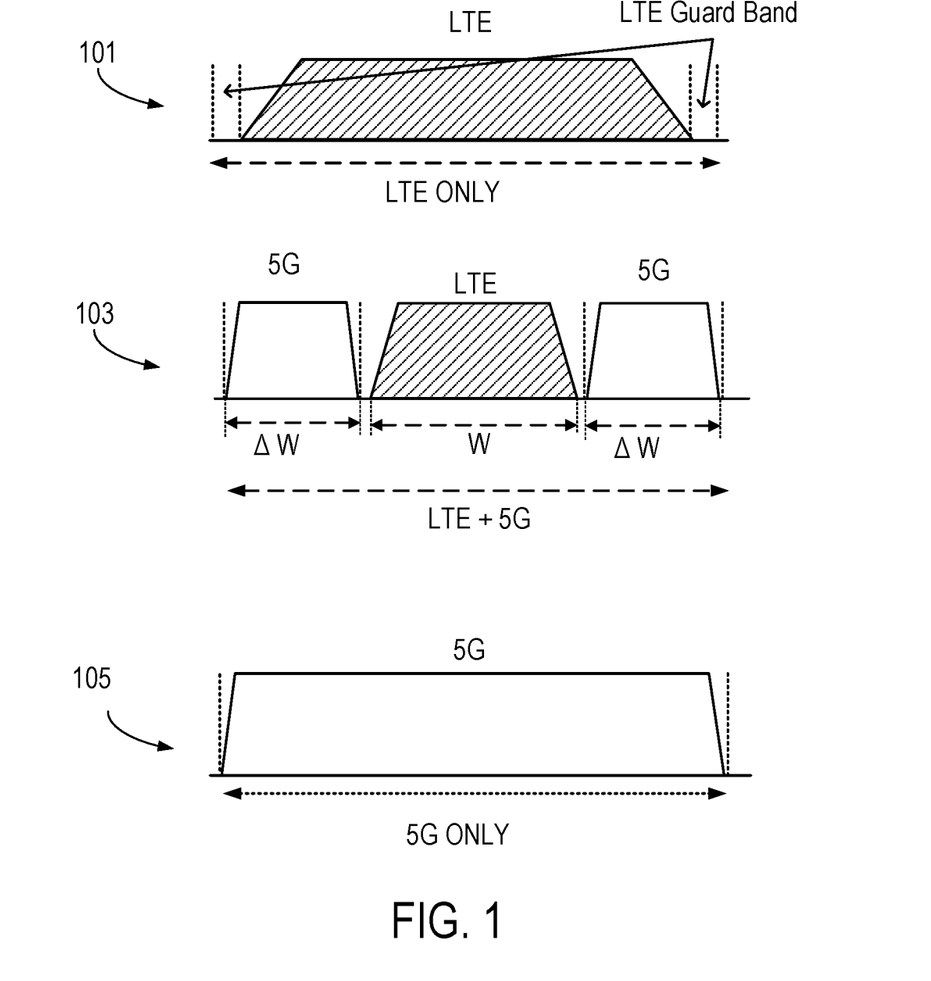
FIG. 1 illustrates the utilization of the sub 6 GHz spectrum for LTE and 5G.

In order to deploy 5G technology, wireless carriers need to carve out 20 MHz or more of spectrum. Not only is that expensive but when the 5G carrier is deployed, the 5G spectrum remains underutilized for a period of time as 5G utilization ramps up. Accordingly, it is desirable to ensure a smooth upgrade path from LTE to 5G, which requires both the LTE RAT and the 5G RAT to be able to operate in the same spectrum as shown in FIG. 1. The sharing in FIG. 1 shows that prior to 5G deployment at 101, the entire spectrum is allocated to LTE. At 103, the spectrum is shared by 5G and LTE. Eventually, when LTE support ends, the entire spectrum is allocated to 5G as shown at 105.

Partitioning the spectrum as shown in FIG. 1 statically, usually leads to loss in efficiency. Because utilization of 5G is small at initial deployment, spectrum allocated to 5G will not be heavily utilized. Similarly, when 5G has significantly penetrated the market and LTE usage has declined, spectrum allocated to LTE becomes underutilized. While periodic reallocation of static spectrum may help alleviate the inefficiency, greater efficiencies can be achieved by requiring that the partitioning between 5G and LTE be dynamic and allowing 5G and LTE channels to reside in the same part of the spectrum. By allowing the spectrum partitioning between 5G and LTE to be completely dynamic, depending on the volume of traffic on LTE and 5G channels, the LTE and 5G channels can be adjusted in frequency and time. Spectrum that is not used by LTE can be dynamically used by 5G and spectrum not used by 5G can be dynamically used by LTE. The dynamic allocation can be achieved over very small time scales such as tens of milliseconds. Thus, although the allocation between 5G and LTE may not change on a per transition time interval (TTI) basis, techniques described herein allow dynamic allocation over fairly short time scales (e.g., tens of milliseconds) using the secondary cell (SCell) activation/deactivation on the LTE carrier. The short time scales of the dynamic partitioning makes it easier and more cost effective to deploy 5G and also allows efficient use of the spectrum resources when 5G technology is deployed and underutilized in the initial deployment phase. In other embodiments, as described further herein rather than being completely dynamic, the spectrum may be shared on a more static basis.

Secondary cell activation/deactivation is a mechanism provided in LTE to achieve carrier aggregation where contiguous or noncontiguous carrier spectrum is added to the primary cell carrier spectrum to achieve higher throughput. For example, the LTE primary cell spectrum may provide 5, 10, 15, or 20 MHz of bandwidth and the secondary cell primary cell spectrum may provide another 5, 10, 15, or 20 MHz.

Figure 2A:
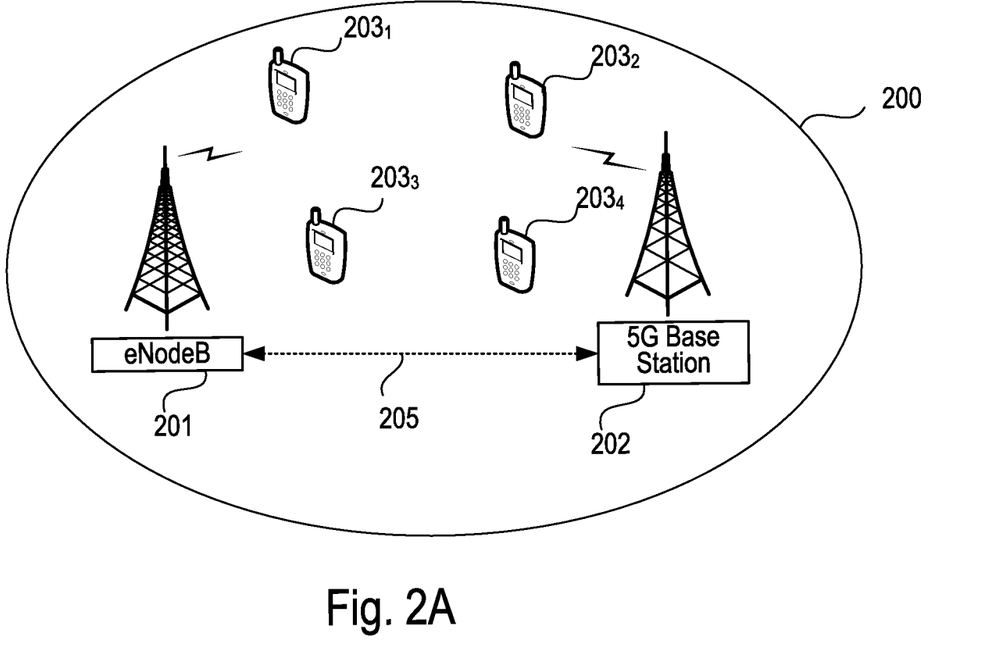
FIG. 2A illustrates an area in which a 5G base station and an eNodeB serve user equipment (UE), some of which have 5G capability and some of which have only LTE capability.
Figure 2B:
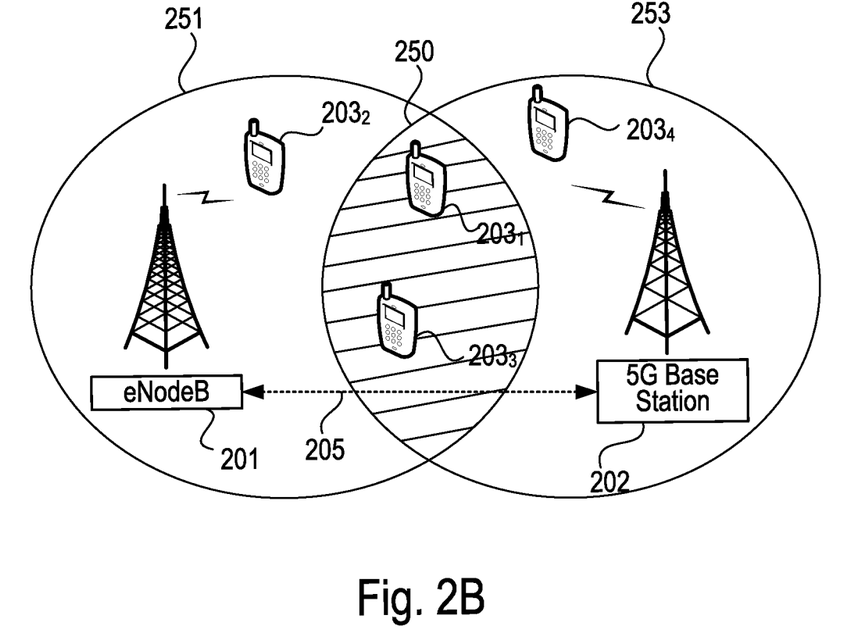
FIG. 2B illustrates an overlap area between a 5G cell and an LTE cell.

FIG. 2A shows an example area 200 being utilized by both 5G and LTE RATs. Note that the area is shown as completely overlapping for the two radio access technologies. The area 200 includes an LTE base station (eNodeB) 201 and a 5G base station 202. The user equipment $203_1$ and $203_4$ are 5G UEs, while the UEs $203_2$ and $203_3$ are LTE devices. Thus, for a sub 6 GHz deployment of 5G, the spectrum in area 200 can be shared by 5G and LTE. A communication interface 205 between enodeB 201 and the 5G base station 202 allows synchronization between the eNodeB and the 5G base station to achieve dynamic partitioning of the spectrum as described further herein. Note that although the 5G base station and eNodeB are shown separately, in embodiments they may be collocated and there may be substantial overlap between the 5G base station and the eNodeB. FIG. 2B shows an embodiment having a partial overlap 250 between the LTE cell 251 and the 5G cell 253.

Co-existence and dynamic partitioning of LTE and 5G in a frequency division duplex (FDD) and time division duplex (TDD) spectrum can be achieved, e.g., for the case when the LTE carrier (or carriers) to be shared has a bandwidth of W and the 5G carrier (or carriers) has a bandwidth of W+ΔW (see FIG. 1). W can be, but is not limited to 5 MHz, 10 MHz, 15 MHz and 20 MHz. ΔW is the additional bandwidth spanned by the 5G carrier. There may be a lower limit to ΔW, which is the minimum 5G channel size. Note that FIG. 1 is not to scale. The 5G and LTE RAT technologies differ. For example, LTE utilizes orthogonal frequency division multiple access/single carrier frequency division multiple access (OFDMA/SCFDMA) for the downlink/uplink. In contrast, the physical layer (L1) of the 5G RAT is expected to use a filtered multicarrier approach, e.g., filtered OFDM, Unified Filtered Multi-Carrier (UFMC), or Filter Bank Multicarrier (FBMC).

Figure 3:
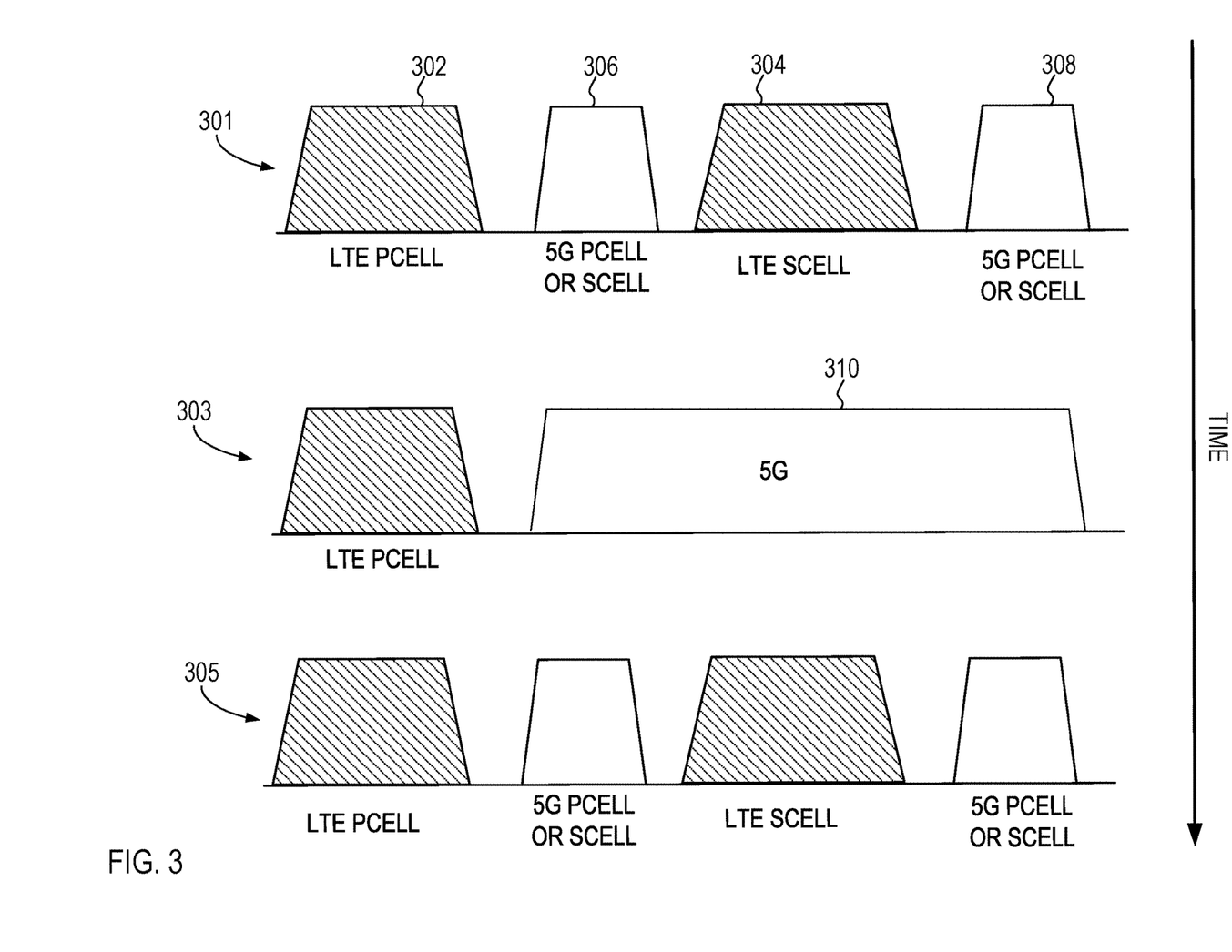
FIG. 3 illustrates dynamic partitioning of the spectrum between 5G and LTE.

FIG. 3 illustrates an embodiment of the dynamic partitioning between LTE and 5G. LTE provides for a technique known as carrier aggregation in which a primary cell (e.g., primary spectrum 302) may be combined with the SCell (e.g., secondary spectrum 304) to provide greater LTE bandwidth. The primary cell provides the control plane while the secondary cell is utilized as a data plane. The additional spectrum may be contiguous or non-contiguous with the primary cell spectrum. FIG. 3 shows an example where the SCell is non contiguous. The LTE carrier to be dynamically shared is configured as a secondary cell (SCell) for all the user equipment (UE) for LTE.

In order to provide dynamic sharing of spectrum between 4G and 5G RATs, two components help enable dynamic sharing. One component is secondary cell activation/deactivation to turn on and off the LTE secondary carrier. In addition, as described further herein, an interface (see 205 in FIG. 2B) is provided between the eNodeB and 5G base stations to coordinate the dynamic allocation of the secondary cell spectrum. The spectrum allocated to the LTE SCell may be turned on and off as rapidly as 10-20 msec. Turning of the SCell dynamically can be done with current LTE capability.

Figure 4:
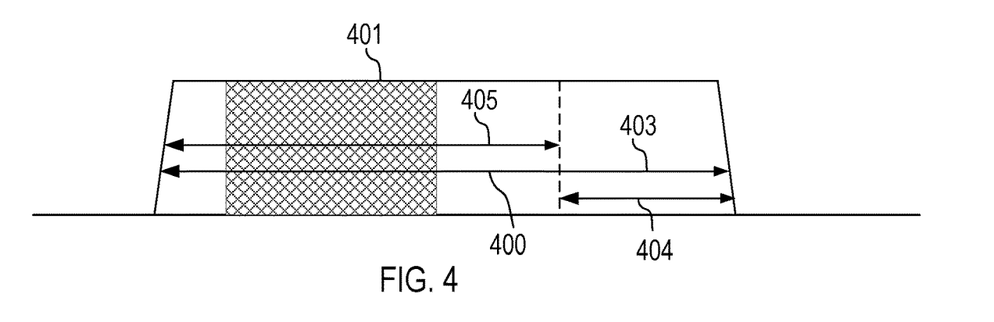
FIG. 4 illustrates how a portion of the 5G primary cell spectrum may be shared with the LTE secondary cell.

In one or more embodiments the 5G RAT can dynamically turn off subcarriers even on the 5G primary cell (PCell). That feature can be useful since even though the LTE carrier is an SCell, some of the spectrum allocated to the LTE SCell may be spectrum allocated to a 5G primary cell. Referring to FIG. 4, assume when the entire spectrum 400 shown is allocated to a 5G PCell, the 5G control plane resides in the spectrum portion 401. The 5G UE measures the entire spectrum 403 for, e.g., channel state information (CSI) measurement, Radio Resource Management (RRM) or Radio link Monitoring (RLM) measurements. However, a portion 404 of the PCell (but not the control plane) may be turned off and allocated to the LTE SCell. The 5G UE are able to handle the dynamic turning on/off the subcarriers (those that overlap with the LTE carrier) without the dynamic turning on/off affecting any measurement procedure for, e.g. channel state information (CSI) measurement, Radio Resource Management (RRM) or Radio link Monitoring (RLM) measurements. The sub-carriers being turned on and off can be handled blindly by the UE or can be explicitly signaled by the 5G network to the UE. That is, the UE can handle the turn/on and off by assuming that absence of the pilot signal on a portion of the spectrum indicates no measurement procedures should be performed on that portion of the spectrum. Thus, if the UE was detecting pilot signals in the spectrum region 404, the UE can conclude based on the later absence of such pilot signals detected by the UE, that the UE should not perform measurement procedures in the portion of the spectrum but only in the region 405 where pilot tones are detected by the UE. The UE may continue to look for pilot tones on a periodic basis to know when to resume measurement procedures on that portion of the spectrum that was turned off. In other embodiments, the 5G network explicitly signals the UEs regarding the turning on/off of the spectrum region 404. Note that only connected devices care about measurements. If the 5G UEs are in idle mode, such measurements typically are not needed.

Figure 5A:
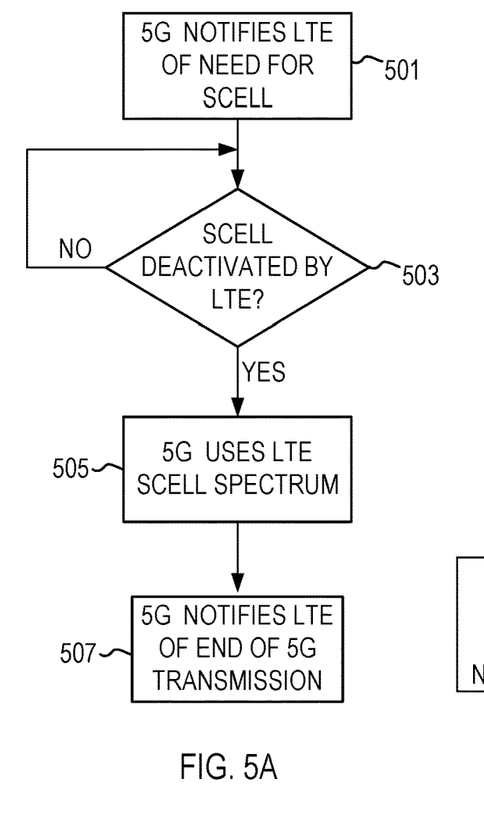
FIG. 5A illustrates a flow diagram of the signaling between a 5G base station and an eNodeB as part of the dynamic partitioning process from the perspective of the 5G base station.
Figure 5B:
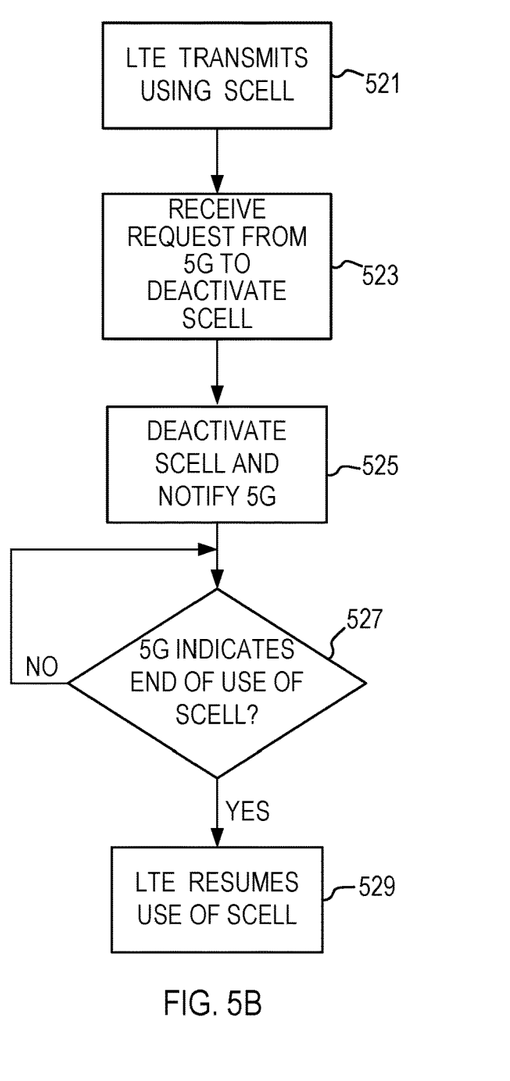
FIG. 5B illustrates a flow diagram of the signaling between a 5G base station and an eNodeB as part of the dynamic partitioning process from the perspective of the eNodeB.

FIGS. 3, 5A, and 5B illustrate dynamic sharing of the LTE SCell spectrum with 5G. Such dynamic sharing requires synchronization between the LTE eNodeB and the 5G base station. Referring to FIG. 3, at time 301, the LTE RAT utilizes the LTE PCell 302 and SCell 304. In addition, the 5G spectrum 306 and 308, which can include PCells and SCells, are operating at the same time in different portions of the spectrum. When the 5G base station needs additional spectrum, e.g., for a burst transmission to one or more 5G UE, the 5G base station utilizes the entire spectrum 310 shown at 303 once the LTE eNodeB deactivates the SCell by ensuring that no transmissions occur by the eNodeB or any LTE UE in that portion of the spectrum. Note that the spectrum 310 is shown as a single carrier but in embodiments may include one or more carriers. Similarly, any of the carriers 302, 304, 306, and 308 may be one or more carriers. Once the burst is complete, the portion of the spectrum 304 can revert back to LTE use as shown at 305.

FIG. 5A illustrates aspects of the synchronization between the 5G base station and the eNodeB from the perspective of the 5G base station. The 5G base station notifies the eNodeB in 501 of the need for spectrum over an interface between LTE eNodeB and 5G base station such as interface 205 shown in FIG. 2A. The interface can be similar to the X2 interface defined for communication between eNodeBs in LTE or can be another interface. The 5G base station waits for an indication in 503 from the eNodeB that the LTE SCell has been (or will be deactivated) and the LTE SCell spectrum will be available after a delay, e.g., a predetermined number of milliseconds after the message is received. When the LTE SCell is de-activated then the 5G base station can start using sub-carriers in the SCell spectrum. After the message from the eNodeB is received, the 5G base station transmits at 505 5G data shown, e.g., at 303 in FIG. 3 utilizing the spectrum previously occupied by the LTE SCell. After the 5G transmission is complete, the 5G base station notifies the eNodeB in 507 that the 5G transmission is complete (or will be complete after a predetermined time period) and turns off the 5G subcarriers in the portion of the spectrum utilized by the LTE SCell. The eNodeB can then resume utilization of the SCell spectrum as shown in 305 (FIG. 3).

The transitions between 301, 303, and 305 can be as fast as tens of milliseconds. In other embodiments, for example, as LTE utilization declines, the LTE RAT may request use of the LTE SCell when demand is sufficiently high and otherwise allow the 5G RAT to utilize the LTE SCell spectrum. When the LTE SCell is activated the 5G carrier needs to stop using that spectrum prior to activation. Note that the spectrum 302, 304, 306, 308, and 310 may be used for downlink and/or uplink communications.

FIG. 5B illustrates the synchronization from the perspective of the eNodeB. At 521 the LTE is transmitting using the SCell spectrum. In 523, the eNodeB receives a request from the 5G base station to deactivate the SCell. The eNodeB deactivates the SCell and notifies the 5G base station in 525. The eNodeB then continues utilization of the LTE primary cell (PCell) for LTE communications while waiting in 527 for an indication from the 5G base station that the SCell spectrum is again available for LTE use. When the indication is received, the LTE resumes use of the SCell in 529. Note that the UEs are notified by the eNodeB of the activation and deactivation of the SCell. Similarly, the 5G devices are notified about the use of the SCell spectrum for 5G communications, or the turn on/off may be handled blindly by the UE as described earlier.

Figure 6A:
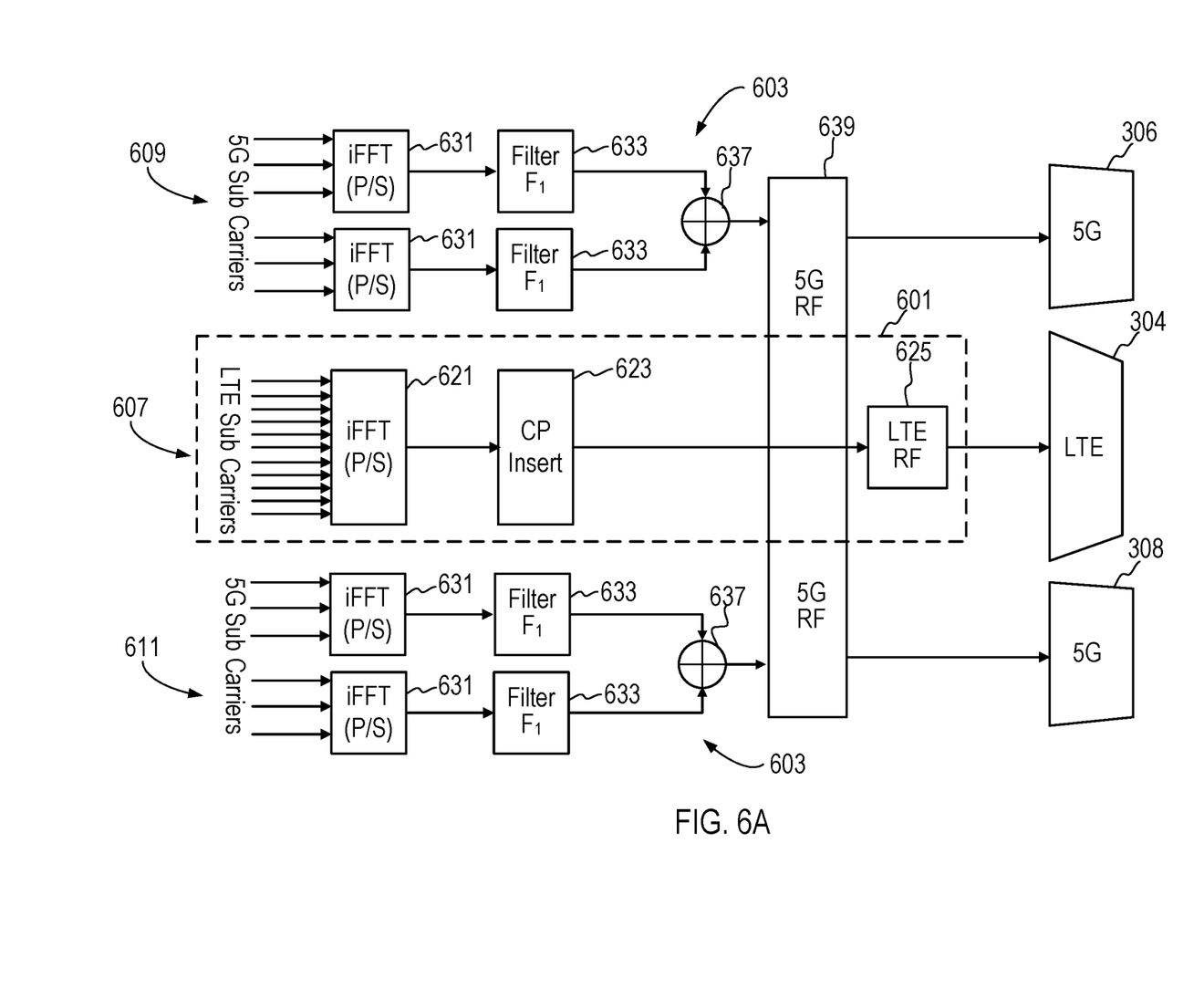
FIG. 6A illustrates a block diagram of 5G and LTE transmitters illustrating how spectrum is shared.

FIG. 6A shows high level block diagrams of the LTE transmitter 601 and the 5G transmitter 603 illustrating how the transmitters can co-exist. Even though logically the LTE eNodeB and the 5G base station are separate logical entities, in some embodiments the LTE eNodeB and 5G base stations may be implemented using a substantial portion of the same hardware. For simplicity, only a portion of the LTE transmitter for the SCell 304 (see FIG. 3) is illustrated. The subcarriers 607 are associated with the LTE SCell 304 (see FIG. 3). The 5G subcarriers 609 and 611 correspond to the portion of the spectrum 306 and 308 allocated to 5G. As shown in FIG. 6A, the LTE transmitter includes an inverse Fast Fourier Transform and parallel to serial conversion block 621, a cyclic prefix insert block 623, and a block 625 to convert the signal to RF for transmission in the LTE spectrum 304. The 5G transmitter includes the iFFT blocks 631, filter 633, which are combined in 637 and converted to 5G RF in block 639 for transmission over the 5G spectrum 306 and 308.

Figure 6B:
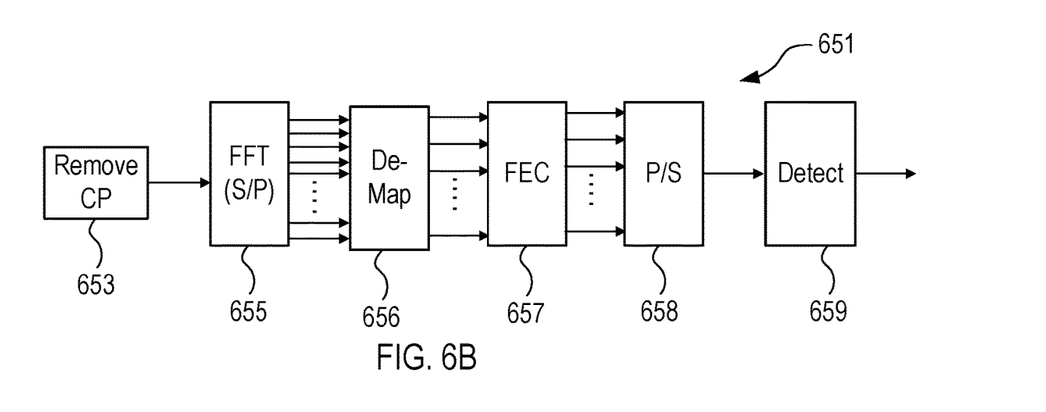
FIG. 6B illustrates a high level block diagram of an LTE receiver.
Figure 6C:
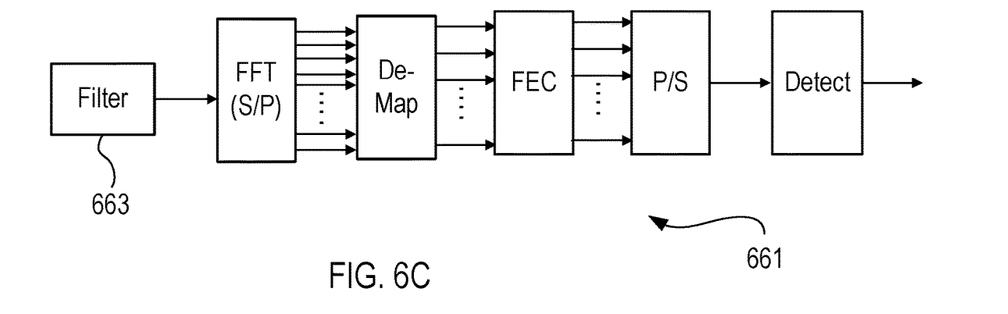
FIG. 6C illustrates a high level block diagram of a 5G receiver.

FIGS. 6B and 6C illustrate embodiments of receivers for LTE and 5G UE receivers. FIG. 6B illustrates a conventional LTE receiver 651 that removes the cyclic prefix in 653, performs an FFT and serial to parallel (S/P) conversion in 655, performs de-mapping in 656, forward error correction (FEC) decoding in 656, and parallel to serial (P/S) conversion in 658, and detection in 659. From a high level block diagram perspective, the 5G receiver 661 is similar but includes the filter 663 corresponding to the filter 633 in the transmitter.

Figure 7:
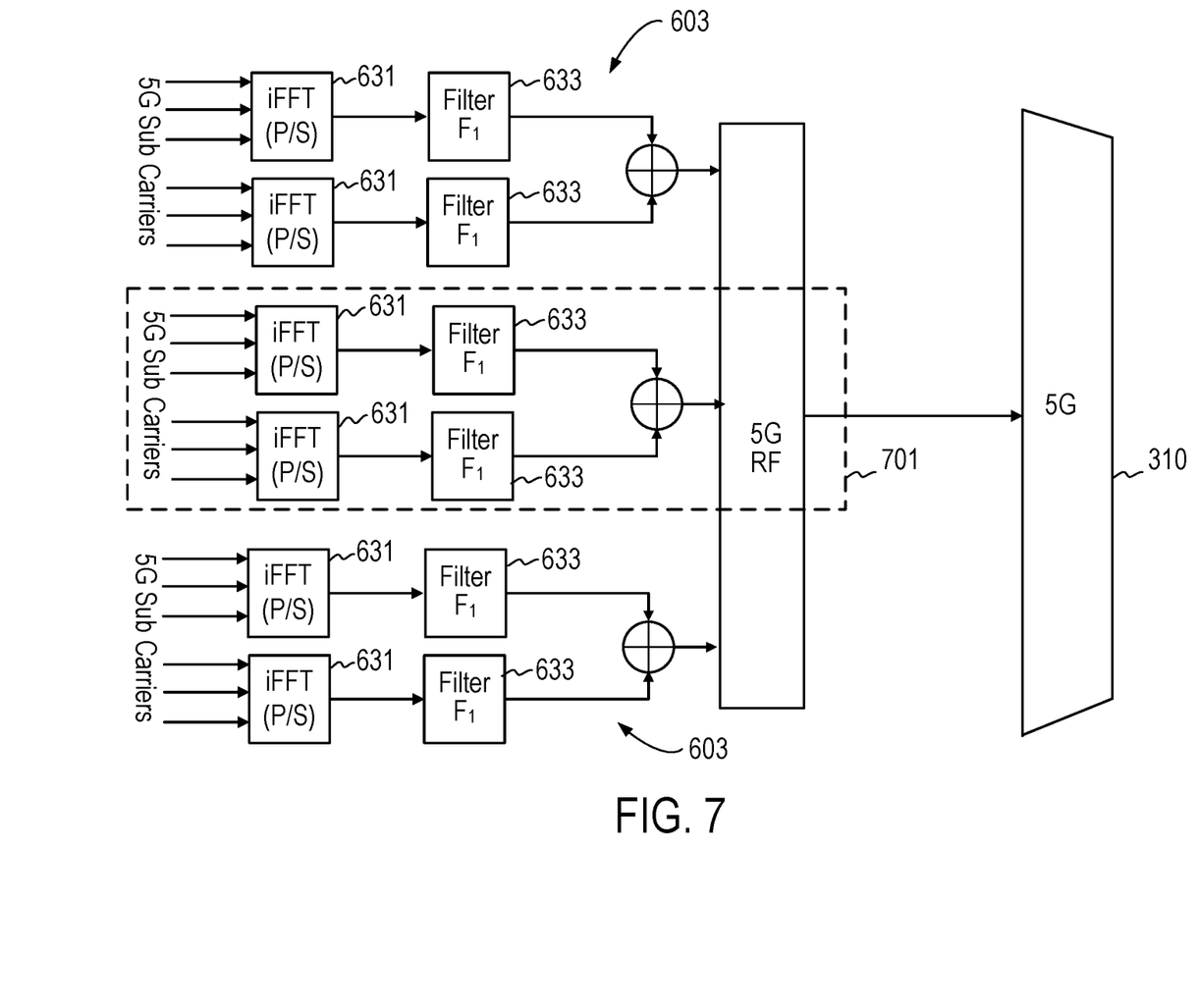
FIG. 7 illustrates the 5G transceiver when the partitioning gives the LTE SCell spectrum to 5G.

When 5G utilizes the LTE SCell spectrum, as shown in FIG. 7, the 5G transmitter utilizes the transmitter portion 701, which is combined with the transmitter portions 603 to utilize the entire spectrum 310 for 5G transmission.

LTE requirements necessitate a conventional guard band between the 5G portion of the spectrum and the LTE portion of the spectrum.

The ability to partition spectrum over such short time scales allows fulfillment of the 5G user experience without requiring very large swaths of spectrum cleared for initial deployment. Such an approach provides possibly multibillion dollars of savings during the 5G roll out since new spectrum does not have to be carved out. Dynamic partitioning of spectrum allows efficient usage of the newly deployed technology even when it is under-utilized in the initial phase.

Figure 8:
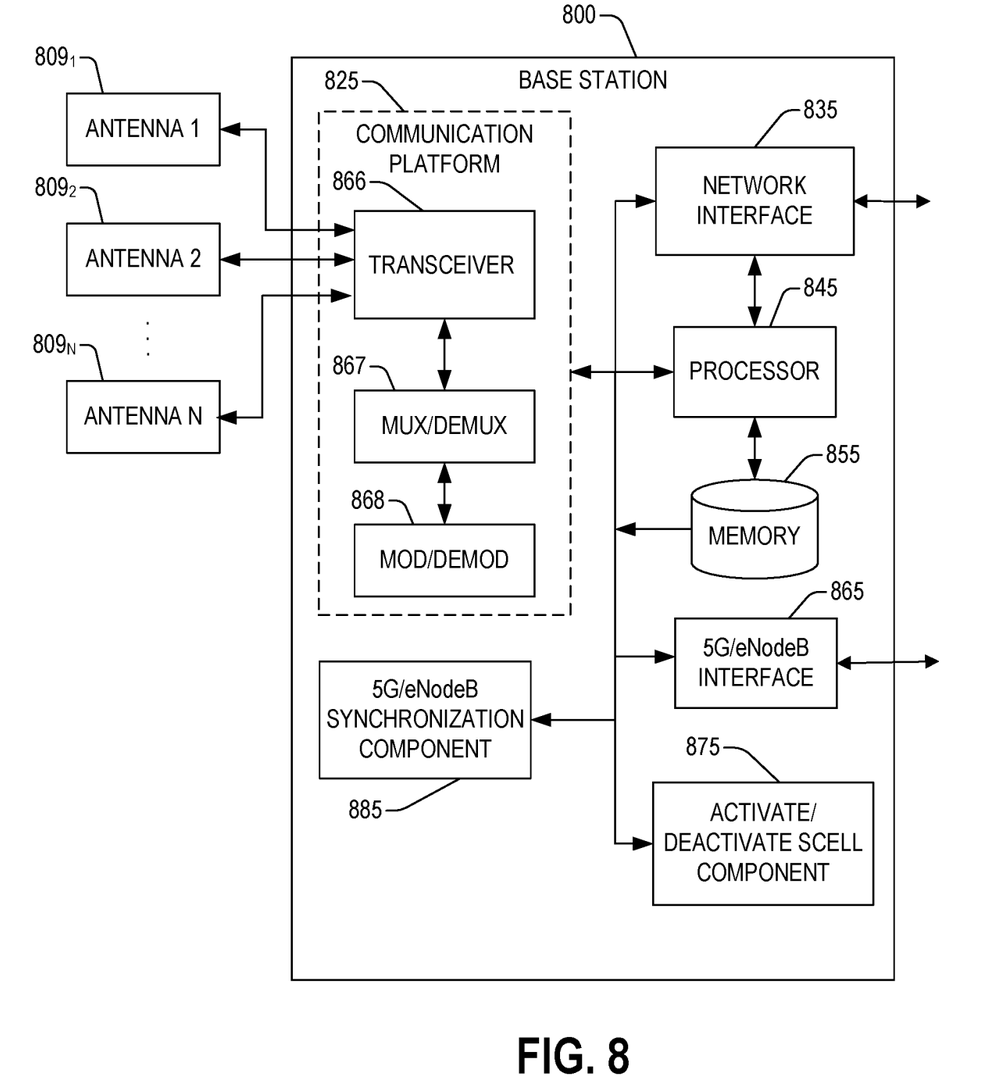
FIG. 8 illustrates an example base station that may be used for 5G and/or LTE communications.

To provide further context for various aspects of the subject specification, FIG. 8 provides a high level block diagram of an example embodiment 800 of a LTE eNodeB or 5G base station that may be used to implement the dynamic partitioning described herein. As previously mentioned, a substantial amount of hardware shown in FIG. 8 may be utilized for both the LTE eNodeB and the 5G base station. For simplicity, FIG. 8 will be described simply as a base station with the understanding that the high level blocks implemented may be utilized by either the 5G base station of an LTE eNodeB in various embodiments described herein. In one aspect, the base station 800 can receive and transmit signal(s) (e.g., data traffic and control signals) to and from user equipment, through a set of antennas 809$_1$-809$_N$, for example, utilizing the spectrum shown in FIG. 3. Antennas 809$_1$-809$_N$ form part of communication platform 825, which includes electronic components and associated circuitry for processing received signal(s) (data and control) and for processing signals (data and control) to be transmitted. Communication platform 825 can include a transmitter/receiver (e.g., a transceiver) 866 that can convert signal(s) from analog format to digital format upon reception, and from digital format to analog format for transmission. In addition, transceiver 866 can divide a single data stream into multiple, parallel data streams, or perform the reciprocal operation. Coupled to transceiver 866 is a multiplexer/demultiplexer 867 that facilitates manipulation of signals in the time and/or frequency domain. Multiplexer/demultiplexer 867 can multiplex information (data/traffic and control/signaling) according to various multiplexing schemes such as time division multiplexing (TDM), frequency division multiplexing (FDM), orthogonal frequency division multiplexing (OFDM), filtered OFDM, etc. In addition, multiplexer/demultiplexer component 867 can scramble and spread information (e.g., codes) according to substantially any code known in the art. A modulator/demodulator 868 is also a part of communication platform 825, and can modulate information according to multiple modulation techniques, e.g., M-ary quadrature amplitude modulation (QAM), with M a positive integer), phase-shift keying (PSK), and the like. The communication platform 825 may include the LTE transmitter 601 and/or the 5G transmitter including portions 603 and 701 (see FIGS. 6A and 7)

Base station 800 also includes one or more processors 845 configured to confer functionality, at least partially, to substantially any electronic component in the base station 800, in accordance with aspects of the subject disclosure. In particular, processor 845 can facilitate implementing configuration instructions, which can include storing data in memory 855. In addition, processor 845 can facilitate processing data (e.g., symbols, bits, or chips, etc.) for multiplexing/demultiplexing, such as effecting direct and inverse fast Fourier transforms, selection of modulation rates, selection of data packet formats, inter-packet times, etc. Moreover, processor 845 can manipulate antennas 809$_1$-809$_N$ to facilitate beamforming or selective radiation pattern formation, which can benefit specific locations covered by the base station 800; and exploit substantially any other advantages associated with smart-antenna technology. Thus, the one or more processors 845 may include digital signal processing capability to effectuate necessary functions associated with reception and transmission of information via antennas 809$_1$ to 809$_N$. Thus, the one or more processors 845 may implement a significant portion of the processing in communication platform 825.

Memory 855 can store data structures, code instructions, and specify capabilities; code sequences for scrambling; spreading and pilot transmission, floor plan configuration, access point deployment and frequency plans; and so on. In one example, computer instructions to implement to synchronization flows shown in FIGS. 5A and/or 5B can be implemented in memory 855.

Processor 845 can be coupled to the memory 855 in order to store and retrieve information necessary to operate and/or confer functionality to communication platform 825, network interface 835 (e.g., that coupled the access point to core network devices such as but not limited to a network controller), and other operational components (e.g., multimode chipset(s), power supply source; not shown) that support the access point 800. The access point 800 can further include an interface 865 for communication between the 5G and eNodeB. That interface may instead utilize network interface 835. The access point may also include component 875 to activate/deactivate SCell spectrum working in conjunction with 5G/eNodeB synchronization component 885 to activate/deactivate SCell spectrum for use by the 5G RAT or the LTE RAT. In addition, it is to be noted that the various aspects disclosed in the subject specification can also be implemented through (i) program modules stored in a computer-readable storage medium or memory (e.g., memory 855) and executed by a processor (e.g., processor 845), or (ii) other combination(s) of hardware and software, or hardware and firmware.

In the subject specification, terms such as "data store," data storage," "database," "cache," and substantially any other information storage component relevant to operation and functionality of a component, refer to any form of memory that can store information and be read by computers or processors. Memory may be volatile memory or nonvolatile memory, or both. Nonvolatile memory can include read only memory (ROM), programmable ROM (PROM), electrically programmable ROM (EPROM), electrically erasable ROM (EEPROM), or flash memory. In addition nonvolatile memory can include magnetic and optical memory. Volatile memory can include random access memory (RAM), available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Figure 9:
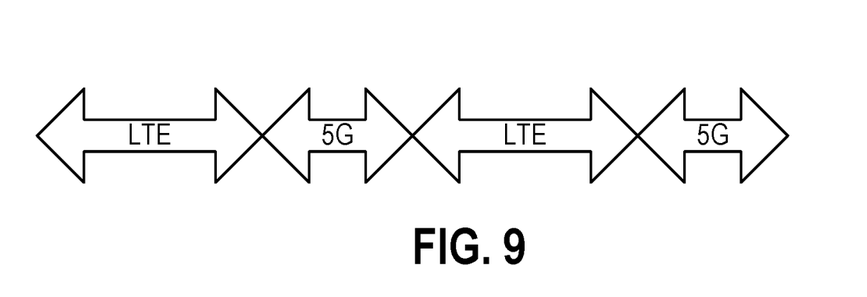
FIG. 9 illustrates sharing spectrum using duty cycles.

While dynamic sharing of the spectrum has been described above, in other embodiments, the different RATs share the spectrum on a more static or semi-static basis by using duty cycles. For example, as shown in FIG. 9, where the LTE usage in the cell is high, 55% of the time the spectrum is allocated for LTE and 45% of the time the spectrum is allocated for 5G. Thus, e.g., out of for every X frames, where X is an integer, 55% of X frames are reserved for LTE and the remaining 45% of X frames are reserved for 5G. The traffic statistics may be monitored and the duty cycle may be adjusted on any suitable time scale, e.g., every day, every hour, every 10 minutes, every 10 seconds, or other appropriate time scale. Such an approach has the advantage of reducing signaling between the eNodeB and the 5G base station regarding dynamic spectrum sharing. The UEs still have adjust to the switching between the 5G and LTE and this can be done either by blind detection at the UE or via explicit signaling from the network.

Thus, aspects of sharing spectrum between LTE and 5G radio access technologies have been described. The description set forth herein is illustrative, and is not intended to limit the scope of the following claims. Variations and modifications of the embodiments disclosed herein may be made based on the description set forth herein, without departing from the scope of the following claims.

What is claimed is:

1. A method for a first radio access technology dynamically sharing spectrum with a second radio access technology comprising:
   a first base station utilizing a first portion of the spectrum as a primary cell during a first time period to communicate with first user equipment in a first area, the first base station using the first radio access technology;

the first base station utilizing a second portion of the spectrum as a secondary cell during the first time period, the secondary cell being aggregated with the first portion of the spectrum to communicate in the first area;

a second base station utilizing the second portion of the spectrum during a second time period to communicate with second user equipment in the first area, the second base station using the second radio access technology; and the second base station and first base station communicating regarding availability of the second portion of the spectrum;

wherein the second user equipment determines that the second portion of the spectrum is unavailable during the first time period responsive to a detected absence of one or more pilot tones in the second portion of the spectrum in the first time period.

2. The method as recited in claim 1,
wherein the second user equipment performs measurement procedures on the second portion of the spectrum during the second time period; and
wherein the second user equipment does not perform measurement procedures on the second portion of the spectrum during the first time period responsive to the detected absence of one or more pilot tones.

3. The method as recited in claim 1, further comprising:
the second user equipment periodically checking for one or more pilot tones in the second portion of the spectrum after the detected absence of one or more pilot tones and resuming measurement procedures responsive to detection of the one or more pilot tones following the detected absence of one or more pilot tones.

4. The method as recited in claim 1, further comprising:
the second base station using a third portion of the spectrum as a primary cell; and
wherein the third portion of the spectrum includes the second portion of the spectrum.

5. The method as recited in claim 1, further comprising:
the second base station signaling a request to the first base station to make the second portion of the spectrum available for use by the second base station.

6. The method as recited in claim 5, further comprising:
the first base station deactivating the second portion of the spectrum responsive to the request; and
the first base station signaling the second base station regarding the deactivating of the second portion of the spectrum.

7. The method as recited in claim 1, further comprising:
the second base station signaling the first base station regarding the availability of the second portion of the spectrum for utilization by the first base station.

8. The method as recited in claim 7, further comprising:
the second base station deactivating subcarriers in the primary cell of the second base station in the second portion of the spectrum to make the second portion of the spectrum available for use by the first base station.

9. The method as recited in claim 1, further comprising:
the first base station notifying, using the first portion of the spectrum, the first user equipment that the second portion of the spectrum is being made available for use.

10. The method as recited in claim 1, further comprising:
the second base station notifying the second equipment that the second portion of the spectrum is being made available for use.

11. A system comprising:
a first base station utilizing a first radio access technology to communicate in a first area with first user equipment and using a first portion of a frequency spectrum as a primary cell and using a second portion of the frequency spectrum as a secondary cell aggregated with the primary cell during a first time period;
a second base station utilizing second radio access technology to communicate with second user equipment in the first area, the second base station utilizing the second portion of the frequency spectrum during a second time period; and
first control logic in the second base station to signal the first base station a request that the first base station make the second portion of the frequency spectrum available for use by the second base station;
wherein the second user equipment is configured to determine that the second portion of the frequency spectrum is unavailable during the first time period responsive to a detected absence of one or more pilot tones in the second portion of the frequency spectrum in the first time period.

12. The system as recited in claim 11, wherein the first base station is responsive to the request to deactivate the second portion of the frequency spectrum.

13. The system as recited in claim 11, wherein,
the second user equipment is configured to perform measurement procedures on the second portion of the frequency spectrum during the second time period; and
the second user equipment is responsive to the detected absence of one or more pilot tones to not perform measurement procedures on the second portion of the frequency spectrum during the first time period.

14. The system as recited in claim 13 the measurement procedures include one or more of channel state information (CSI) measurement, Radio Resource Management (RRM), or Radio link Monitoring (RLM) measurements.

15. The system as recited in claim 13, wherein,
the second user equipment is configured to periodically check for one or more pilot tones in the second portion of the frequency spectrum after the detected absence of one or more pilot tones; and
the second user equipment is responsive to detection of the one or more pilot tones following the detected absence of one or more pilot tones, to resume measurement procedures in the second portion of the frequency spectrum.

16. The system as recited in claim 11, wherein the second base station signals the first base station that the second portion of the frequency spectrum is available for activation by the first base station as the secondary cell.

17. The system as recited in claim 11, wherein the first and second portions of the frequency spectrum are below 6 GHz.

18. A method for a first radio access technology dynamically sharing spectrum with a second radio access technology comprising:
a first base station utilizing a first portion of the spectrum as a primary cell during a first time period to communicate with first user equipment in a first area, the first base station using the first radio access technology;
the first base station utilizing a second portion of the spectrum as a secondary cell during the first time period, the secondary cell being aggregated with the first portion of the spectrum to communicate in the first area;
a second base station utilizing the second portion of the spectrum during a second time period to communicate with second user equipment in the first area, the second base station using the second radio access technology;

the second user equipment not performing measurement procedures on the second portion of the spectrum responsive to an absence of pilot tones in the second portion of the spectrum detected by the second user equipment after having detected pilot tones in the second portion of the spectrum;

the second user equipment periodically checking for presence of pilot tones after detecting the absence of pilot tones; and the second user equipment resuming performing measurement procedures on the second portion of the spectrum responsive to detection of pilot tones while periodically checking.

19. The method as recited in claim 18, further comprising:
the first base station notifying, using the first portion of the spectrum, the first user equipment that the second portion of the spectrum is being made available for use.

20. The method as recited in claim 18, further comprising:
the second base station notifying the second equipment that the second portion of the spectrum is being made available for use.

* * * * *